United States Patent [19]

Kim et al.

[11] Patent Number: 4,741,586
[45] Date of Patent: May 3, 1988

[54] DYNAMIC COUPLER USING TWO-MODE OPTICAL WAVEGUIDES

[75] Inventors: Byoung Y. Kim, Menlo Park; Herbert J. Shaw, Stanford, both of Calif.

[73] Assignee: The Board of Trustees of the Leland Stanford Junior University, Stanford, Calif.

[21] Appl. No.: 17,762

[22] Filed: Feb. 20, 1987

[51] Int. Cl.[4] .................................................. G02B 6/26
[52] U.S. Cl. ............................. 350/96.15; 350/96.10; 350/96.29
[58] Field of Search ............... 350/96.10, 96.12, 96.13, 350/96.14, 96.15, 96.16, 96.29, 96.30

[56] References Cited

U.S. PATENT DOCUMENTS 4,669,814  6/1987  Dyott ................................ 350/96.15
4,679,894  7/1987  Pavlath .......................... 350/96.15

OTHER PUBLICATIONS

"Highly Selective Evanescent Modal Filter for Two-Mode Optical Fibers", Optics Letters, vol. 11, No. 9, Sep. 1986, pp. 581-583.
"Preservation of Polarization in Single-Mode Fibers" By Rashleigh et al., Fiberoptic Technology, May 1983.
"Weakly Guiding Fibers", Applied Optics, vol. 10, No. 10, Oct. 1971, pp. 2252-2258.
"Two-Mode Fiber Modal Coupler", Optics Letters, vol. 9, No. 5, May 1984, pp. 177-179.
"All-Fiber Components Using Periodic Coupling", IEEE Proceedings, vol. 132, Pt. J. No. 5, Oct. 1985, pp. 277-286.
"All-Fiber Acousto-Optic Frequency Shifter", Optics Letters, vol. 11, No. 6, Jun. 1986, pp. 389-391.
"Fiber-Optic Modal Coupler Using Periodic Microbending", by Blake et al., Optics Letters, vol. 11, No. 3, Mar. 1986.
J. N. Blake, et al., "All-Fiber Acousto-Optic Frequency Shifter Using Two-Mode Fiber," Proceedings of the SPIE, vol. 719, 1986.
Allan W. Snyder, et al., "Optical Fibers of Arbitrary Cross-Sections," Journal of the Optical Society of America A, vol. 3, No. 5, May 1986, pp. 600-609.

Primary Examiner—William L. Sikes
Assistant Examiner—AKM E. Ullah
Attorney, Agent, or Firm—Knobbe, Martens, Olson & Bear

[57] ABSTRACT

An optical mode coupling apparatus includes an optical waveguide that couples an optical signal from one propagation mode of the waveguide to a second propagation mode of the waveguide. The optical signal propagating in the waveguide has a beat length, and the coupling apparatus includes a source of perturbational light signal that propagates in the waveguide in two spatial propagation modes having different propagation constants so as to have a perturbational signal beat length. The perturbational signal has an intensity distribution in the waveguide that causes periodic perturbations in the refractive indices of the waveguide in accordance with the perturbational signal beat length. The periodic perturbations of the refractive indices of the optical waveguide cause cumulative coupling of the optical signal from one propagation mode to another propagation mode. The perturbational light signal can be selectively enabled and disabled to selectively enable and disable coupling of the optical signal between the propagation modes.

17 Claims, 4 Drawing Sheets

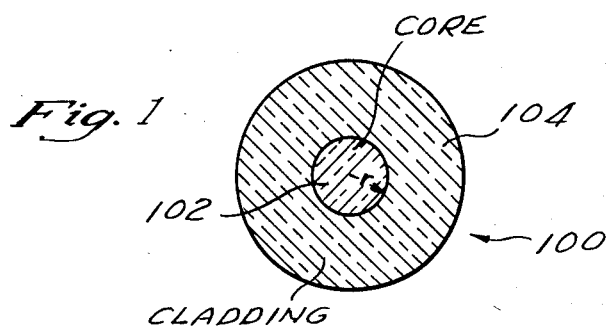
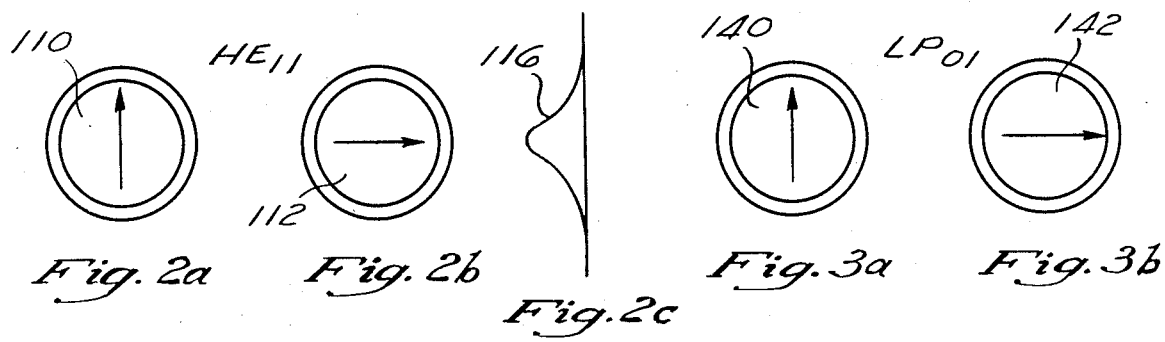
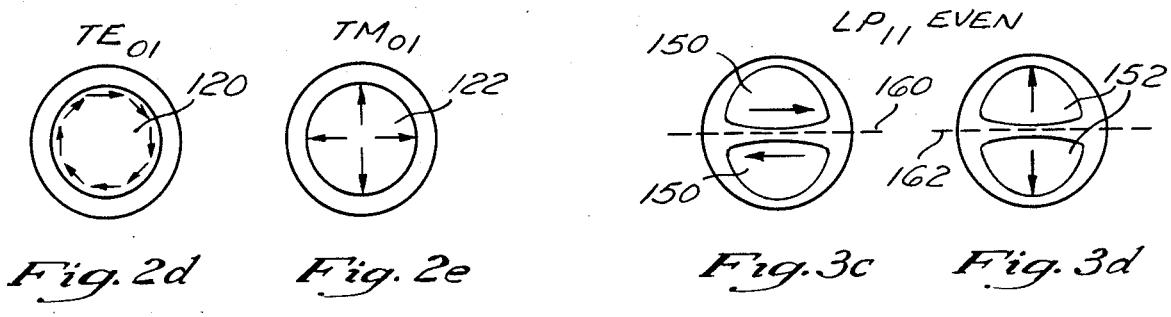
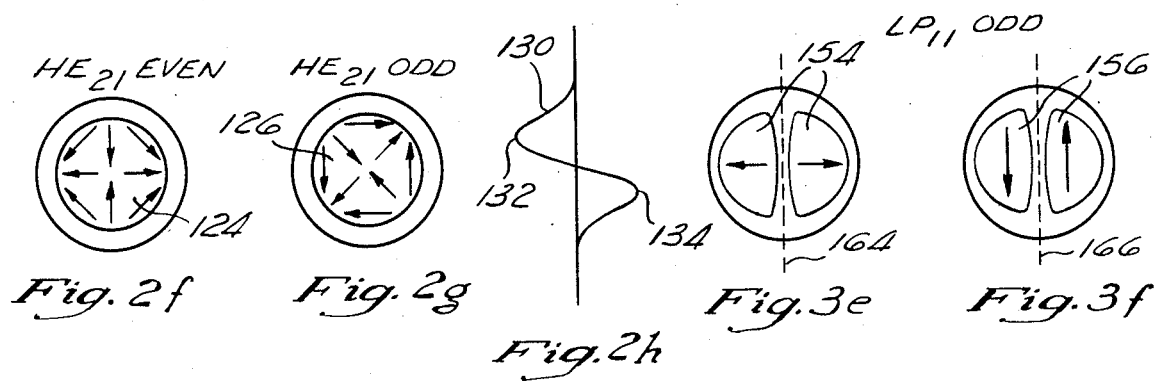

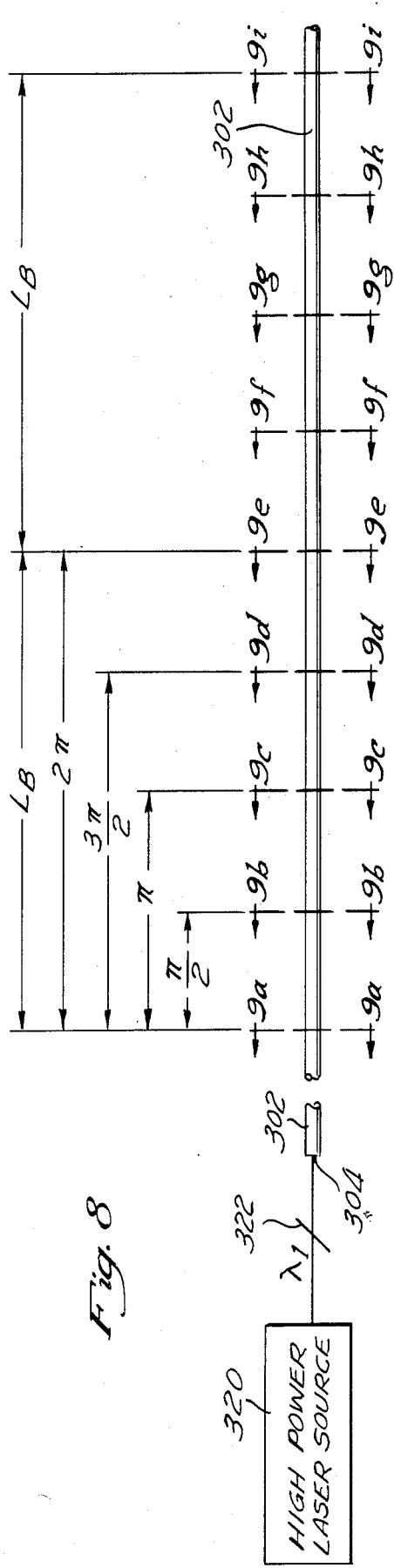
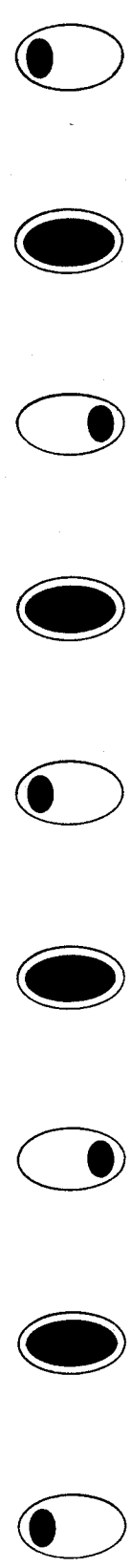
Fig. 8
Fig.9a Fig.9b Fig.9c Fig.9d Fig.9e Fig.9f Fig.9g Fig.9h Fig.9i

DYNAMIC COUPLER USING TWO-MODE OPTICAL WAVEGUIDES

FIELD OF THE INVENTION

The present invention relates generally to optical waveguide devices and, more specifically, to devices which incorporate two-mode optical waveguides to control the propagation of optical energy in the two-mode of waveguide.

BACKGROUND OF THE INVENTION

An optical fiber is an optical waveguide having a central core surrounded by an outer cladding. The refractive indices of the core and cladding are selected so that optical energy propagating in the optical fiber is well-guided by the fiber.

As is well known in the art, a single optical fiber may provide one or more propagation paths under certain conditions. These propagation paths are commonly referred to as the normal modes of a fiber, which may be conceptualized as independent optical paths through the fiber. Normal modes have unique electric field distribution patterns which remain unchanged, except for amplitude as the light propagates through the fiber. Additionally, each normal mode will propagate through the fiber at a unique propagation velocity.

The number of modes which may be supported by a particular optical fiber is determined by the wavelength of the light propagating therethrough. If the wavelength is greater than a "second order mode cutoff" wavelength (i.e., the frequency of the light is less than a cutoff frequency), the fiber will support only a single mode. If the wavelength is less than cutoff (i.e., the frequency is greater than the cutoff frequency), the fiber will begin to support higher order modes. For wavelengths less than, but near cutoff, the fiber will support only the fundamental, or first order mode, and the next, or second order mode. As the wavelength is decreased, the fiber will support additional modes, for example, third order, fourth order, etc.

Each of the normal modes (e.g., first order, second order, etc.) are orthogonal, that is, ordinarily, there is no coupling between the light in these modes. The orientation of the electric field vectors of the modes defines the polarization of the light in the mode, for example, linear vertical or linear horizontal. A more complete discussion of these modes, and their corresponding electric field patterns, will be provided below.

A number of devices have been constructed to utilize the orthogonality of the modes of an optical fiber to provide selective coupling between the modes. For example, copending U.S. patent application Ser. No. 884,871, entitled "Fiber Optic Modal Coupler," assigned to the assignee of this invention, describes a device which couples optical energy from the first order mode to the second order mode, and vice versa. U.S. patent application Ser. Nos. 820,513 and 909,503, both entitled "Fiber Optic Inter-Mode Coupling Single-Sideband Frequency Shifter," and both assigned to the assignee of this invention, disclose frequency shifters which couple optical energy from one propagation mode to another propagation mode while shifting the frequency of the optical energy. U.S. patent application Ser. No. 820,411, entitled "Fiber Optic Mode Selector," assigned to the assignee of the present invention, discloses a device which separates optical energy propagating in one of the first order and second order propagation modes from the other of the first order and second order propagation modes.

SUMMARY OF THE INVENTION

The present invention is an optical mode coupling apparatus which comprises an optical waveguide that couples an optical signal propagating in the optical waveguide between propagation modes of the waveguide. The optical signal has an optical signal beat length for the modes, and the coupling apparatus also includes a light source for introducing a perturbational light signal into the waveguide. The perturbational signal has an optical wavelength selected such that the perturbational signal propagates in the waveguide in two spatial modes which have different propagation constants so as to cause the perturbational signal to beat in the waveguide in accordance with a perturbational signal beat length, and thereby cause the perturbational signal to have an intensity distribution in the waveguide which varies along the length of the waveguide. The perturbational signal has an intensity which is selected to optically perturb the refractive index of the waveguide, preferably in accordance with the optical Kerr effect, at intervals defined by the perturbational signal beat length. The optical wavelength of the perturbational signal is further selected such that the intervals have a spacing related to the beat length of the optical signal to cause cumulative coupling of the optical signal from one of the propagation modes to another.

In the preferred embodiment, the optical waveguide has a non-circular cross section having cross-sectional dimensions selected such that the waveguide guides a portion of the perturbational light signal in a fundamental spatial mode and another portion in a higher order spatial mode. The cross-sectional dimensions of the core are further selected such that the portion of the perturbational signal guided by the waveguide in the higher order mode propagates in only a single, stable intensity pattern. The preferred embodiment utilizes the fundamental spatial mode of the waveguide and a higher order spatial mode, preferably the second order spatial mode. The cross-sectional dimensions of the core may be further selected to cause the polarization modes of the two spatial modes to be nondegenerate such that they propagate light at different velocities.

Although the invention may be utilized in connection with various types of waveguides, the waveguide of the preferred embodiment comprises an optical fiber which has an elliptical cross-section core, such that the fundamental mode is the $LP_{01}$ mode of the optical fiber and the higher order mode is the $LP_{11}$ mode of the optical fiber. The single intensity pattern is the even mode intensity pattern of the $LP_{11}$ mode.

Advantageously the present invention may be implemented as a digital switch. In this implementation, the perturbational signal is selectively switched on and off to switch the coupling on and off.

The invention also includes a method of coupling an optical signal between propagation modes of a waveguide having a beat length for the modes. The method comprises the step of introducing a perturbational optical signal into the waveguide such that the perturbational signal propagates in two spatial modes of the waveguide to cause the perturbational signal to beat in accordance with a perturbational signal beat length. The intensity of the perturbational signal is selected to cause optical perturbation of the waveguide at intervals defined by the perturbational signal beat length. The wave length of the perturbational signal is selected such that the intervals have a spacing related to the beat length of the optical signal to cause the coupling to be cumulative at the intervals. Preferably, the waveguide comprises an optical fiber and the perturbations are induced in accordance with the optical Kerr effect. In a preferred embodiment, the method also includes the step of switching the perturbational signal between a relatively high intensity level and a relatively low intensity level. Additionally, the waveguide preferably has a core of non-circular cross section, and the method additionally comprises the step of selecting the wavelength of the optical signal in relation to the cross-sectional dimensions of the core such that (1) the waveguide guides a portion of the optical signal in one spatial mode and another portion in a higher order spatial mode, such as the second order mode, and (2) the portion of the optical signal guided by the waveguide in the higher order mode propagates in only a single, stable, intensity pattern. The method also preferably comprises the step of selecting the wavelength of the perturbational signal in relation to the cross-sectional dimensions of the core of the waveguide such that (1) the waveguide guides a portion of the perturbational signal in one spatial mode and another portion in a higher order spatial mode, and (2) the portion of the perturbational signal guided by the waveguide in the higher order mode propagates in only a single, stable intensity pattern.

BRIEF DESCRIPTION OF THE DRAWINGS

FIG. 1 is a cross-sectional view of an exemplary circular core optical fiber.

FIGS. 2a and 2b illustrate the electric field intensity distribution patterns for the vertically polarized and horizontally polarized $HE_{11}$ (fundamental) propagation modes of the circular core optical fiber of FIG. 1.

FIG. 2c is a graph of the electric field amplitude distribution corresponding to the intensity distribution patterns of FIGS. 2a and 2b.

FIGS. 2d, 2e, 2f, and 2g illustrate the electric field intensity distribution patterns for the $TE_{01}$, $TM_{01}$, even $HE_{21}$ and odd $HE_{21}$ (second order) propagation modes, respectively, of the circular core optical fiber of FIG. 1.

FIG. 2h is a graph of the electirc field amplitude distribution patterns for the second order modes of the optical fiber of FIG. 1.

FIGS. 3a and 3b illustrate the $LP_{01}$ approximations for the first order propagation modes of the optical fiber of FIG. 1.

FIGS. 3c, 3d, 3e, and 3f illustrate the $LP_{11}$ approximations for the second order propagation modes of the optical fiber of FIG. 1.

FIG. 8 illustrates a portion of the optical fiber from the dynamic optical coupler of FIG. 7.

FIGS. 9a–9i illustrate cross sections of the electrical field intensity patterns taken at locations 9a—9a, 9b—9b, etc. in FIG. 8.

FIG. 11a illustrates the $LP_{11}$ intensity pattern of the light emitted by the embodiment of FIG. 10 when the perturbational light source is on.

FIG. 11b illustrates the $LP_{01}$ intensity pattern of the light emitted by the embodiment of FIG. 10 when the perturbational light source is off.

DETAILED DESCRIPTION OF THE PREFERRED EMBODIMENTS

Figure 4:
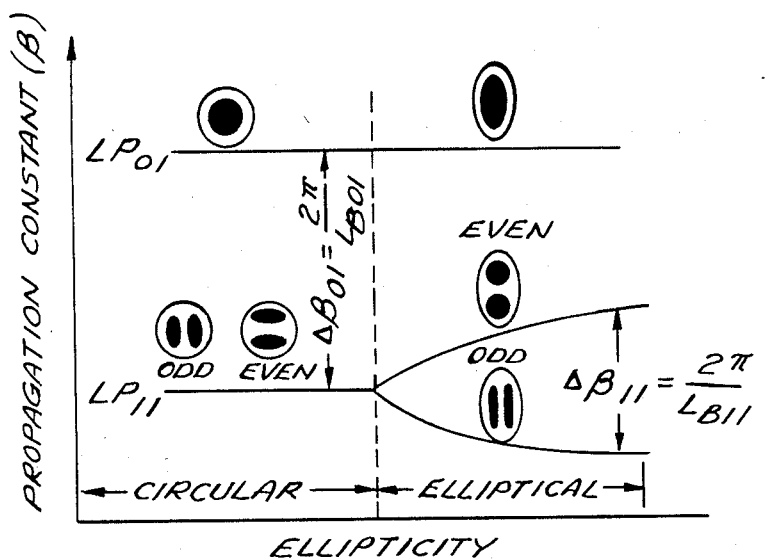
FIG. 4 is an unscaled graph of the propagation constant of an optical waveguide versus the ellipticity of the core of the optical waveguide.

The present invention utilizes an optical waveguide that operates at a wavelength below cutoff such that the waveguide supports both fundamental and second order guided modes. The fundamental and second order guided modes provide two orthogonal paths through the optical waveguide which permits the device to be used as a two-channel optical propagation medium. The embodiments of the present invention utilize an optical waveguide having the geometry of the core selected so that only one stable spatial orientation of the second order mode is suproted in the waveguide.

Before discussing the specific embodiments of the present invention, a detailed description of the optical waveguide and a brief summary of the applicable mode theory will be presented to provide a more complete understanding of the invention. Although described below in connection with a silica glass optical fiber waveguide, one skilled in the art will understand that the concepts presented are also applicable to other optical waveguides, such as a $LiNbO_3$ optical fiber, integrated optics, or the like.

MODE THEORY

An exemplary cross-section of a silica glass optical fiber 100 is illustrated in FIG. 1. The fiber 100 comprises an inner core 102 and an outer cladding 104. The inner core 102 has a radius of r. In the exemplary fiber 100, the core has a refractive index $n_{co}$ and the cladding has a refractive index $n_{cl}$. As is well known in the art, the core refractive index $n_{co}$ is greater than the cladding index $n_{cl}$ so that an optical signal propagating in the optical fiber 100 is well-guided. The number of modes guided by the optical fiber 100 depends upon the fiber geometry and upon the wavelength of the optical signal propagating therethrough. Typically, the wavelength above which an optical fiber will propagate only the fundamental or first order mode is referred to as the "second order mode cutoff" wavelength $\lambda_c$, which may be calculated for a circular core fiber utilizing the following equation:

$$\lambda_c = \frac{2\pi r \sqrt{n_{co}^2 - n_{cl}^2}}{2.405} \qquad (1)$$

If the wavelength of the optical signal is greater than the wavelength $\lambda_c$ (i.e., the frequency of the optical signal is less than a cutoff frequency), only the first order or fundamental propagation mode of the optical signal will be well-guided by the fiber and will be propagated by the fiber. If the wavelength of an optical signal is less than $\lambda_c$ (i.e., the frequency of the optical signal is greater than the cutoff frequency), higher order modes, such as the second order modes, will begin to propagate.

The true first and second order modes of a circular core optical fiber and their respective electric field amplitude distributions are illustrated in FIGS. 2a–2h. The two first order modes are the vertically polarized $HE_{11}$ mode represented by an electric field pattern 110 in FIG. 2a, and the horizontally polarized $HE_{11}$ mode, represented by an electric field pattern 112 in FIG. 2b. The outer circle in each figure represents the boundary of the core 102 of the fiber 100 of FIG. 1.

As illustrated in FIG. 2c, the $LP_{01}$ modes have an electric field amplitude distribution 116 that is substantially symmetrical around the center line of the core 102. The electric field amplitude distribution 116 is concentrated in the center of the core 102 and decreases as the distance from the center of the core 102 increases. A small portion of the electric field amplitude distribution 116 often extends beyond the boundaries of the core. This extended electric field is commonly referred to as the evanescent field of the guided modes.

The four true second order modes are illustrated in FIGS. 2d–2g. These four true modes are distinguished by the orientation of the transverse electric field, denoted by the directions of the arrows in FIGS. 2d–2g, and are commonly referred to as the $TE_{01}$ mode, represented by an electric field pattern 120 in FIG. 2d; the $TM_{01}$ mode, represented by an electric field pattern 122 in FIG. 2e; the $HE_{21}$ even mode, represented by an electric field pattern 124 in FIG. 2f; and the $HE_{21}$ odd move, represented by an electric field pattern 126 in FIG. 2g.

An electric field amplitude distribution 130 for an exemplary optical signal propagating in the second order modes is illustrated in FIG. 2h. As illustrated, the electric field amplitude distrubotion 130 is substantially equal to zero at the central line of the core, and has two maximum amplitudes 132 and 134 near the boundary of the core. As further illustrated, the two amplitude maxima 132 and 134 are 180° out of phase. Further, a greater portion of the electric field distribution extends beyond the boundary of the core in the second order modes, thus providing a larger evanescent field than for the $HE_{11}$ modes.

Each of the four true second order modes has a slightly different propagation velocity from the other of the four second order modes. Thus, when one or more of the true second order modes are co-propagating in a two-mode fiber, the intensity distribution of the second order mode varies as a function of the length of the fiber as a result of changes in the phase differences between the four modes as they propagate. The cross-sectional intensity distribution of the second order mode changes in response to environmental changes that induce differential phase shifts between the almost degenerate four modes.

In order to more easily analyze the characteristics of optical signals propagating in the second order propagation modes, the characteristics of the mdoes are analyzed using the LP approximations for the modes defined and described in detail in D. Gloge, "Weakly Guiding Fibers," *Applied Optics*, Vol. 10, No. 10, October 1971, pp. 2252–2258.

A better understanding of the mode theory of optical propagation in an optical fiber or other circular core waveguide can be obtained by referring the FIGS. 3a–3f, and wherein the first and second modes are represented in accordance with the LP approximations described by Gloge in his paper. The outer circles in each of the illustrations again represent the cross-section of the core 102 of the optical fiber 100 of FIG. 1. The outlines within the core circles represent the electric field distributions. Arrows with the inner outlines represent the direction of polarization.

FIGS. 3a–3b show the field patterns of the two polarization modes in the fundamental $LP_{01}$ set of modes. A field pattern 140 in FIG. 3a represents vertically polarized light in the $LP_{01}$ fundamental mode, and a field pattern 142 in FIG. 3b represents horizontally polarized light in the fundamental $LP_{01}$ mode.

FIGS. 3c–3f illustrate the $LP_{11}$ approximations for the second order modes. As illustrated in FIGS. 3c–3f, there are four $LP_{11}$ modes, each having two lobes for the electric field distribution. Two of the modes, represented by an $LP_{11}$ mode pattern 150 in FIG. 3c and an $LP_{11}$ mode pattern 152 in FIG. 3d, are referred to herein as the $LP_{11}$ even modes. The other two $LP_{11}$ modes, represented by an $LP_{11}$ mode pattern 154 in FIG. 3e and $LP_{11}$ mode pattern 156 in FIG. 3f, are referred to as the $LP_{11}$ odd modes. The four $LP_{11}$ modes are distinguished by the orientation of the lobe patterns and the orientation of the electric field vectors (i.e., the polarization vectors) within the lobe patterns. For example, the first $LP_{11}$ even mode field pattern 150 (FIG. 3c) has two lobes that are symmetrically located about a horizontal zero electric field line 160. Within the two lobes, the electric field vectors are parallel to and antisymmetric about the zero electric field line 160. For convenience, the $LP_{11}$ mode represented by the lobe pattern 150 will be referred to as the horizontally polarized $LP_{11}$ even mode.

The second $LP_{11}$ even lobe pattern 152 (FIG. 3d) is symmetrically located about a horizontal zero electric field line 142. Within the two lobes of the field pattern 152, the electric field vectors are perpendicular to and antisymmetric about the zero electric field line 162. The $LP_{11}$ mode represented by the electric field pattern 152 will be referred to as the vertically polarized $LP_{11}$ even mode.

The first $LP_{11}$ odd mode field pattern 154 has two lobes that are symmetrically located about a vertically oriented zero electric field line 164. Within the two lobes, the electric field vector is perpendicular to and antisymemtric about the zero electric field line 164, and are thus oriented horizontally. The $LP_{11}$ mode represented by the field pattern 154 will thus be referred to as the horizontally polarized $LP_{11}$ odd mode.

The electric field pattern 156 of the second $LP_{11}$ odd mode has two lobes that are symmetrically located about a vertically oriented zero electric field line 166.

Within the two lobes, the electric field vectors are parallel to and antisymmetric about the zero electric field line 166. Thus, the $LP_{11}$ mode represented by the electric field pattern 156 will be referred to as the vertically polarized $LP_{11}$ odd mode.

In the LP-mode approximations, each of the six electric field patterns in FIGS. 3a–3f, namely, the two $LP_{01}$ patterns and the four $LP_{11}$ patterns, are orthogonal to each other. In other words, in the absence of perturbations to the optical waveguide, there is substantially no coupling of optical energy from one of the field patterns to any of the other field patterns. Thus, the six electric field patterns may be viewed as independent optical paths through the optical waveguide, which ordinarily do not couple with each other.

If the indices of the core 102 and the cladding 104 of the optical fiber 100 are approximately equal, the two $LP_{01}$ modes will travel through the fiber at approximately the same propagation velocity, and the four second order $LP_{11}$ modes will travel through the fiber at approximately the same propagation velocity. However, the propagation velocity for the fundamental $LP_{01}$ set of modes will be slower than the propagation velocity for the second order $LP_{11}$ set of modes. Thus, the two sets of modes, $LP_{01}$ and $LP_{11}$, will move in and out of phase with each other as the light propagates through the fiber. The propagation distance required for the two sets of modes to move out of phase by 360° (i.e., $2\pi$ radians) is commonly referred to as the beat length of the fiber, which may be mathematically expressed as:

$$L_B = \frac{\lambda}{\Delta n} = \frac{2\pi}{\Delta \beta} \quad (2)$$

where $L_B$ is the beat length, $\lambda$ is the optical wavelength in a vacuum, $\Delta n$ is the difference in the effective refractive indices of the two sets of modes, and $\Delta\beta$ is the difference in the propagation constants for the two sets of modes.

It has been previously shown that coherent power transfer between the two sets of the modes, $LP_{01}$ $LP_{11}$, can be achieved by producing periodic perturbations in the optical fiber that match the beat length of the two modes. A number of optical devices have been constructed to control the coupling of optical energy between the two modes to provide useful devices for selective coupling, filtering and frequency shifting of an optical signal. See, for example, W. V. Sorin, et al., "Highly selective evanescent modal filter for two-mode optical fibers," *Optics Letters*, Vol. 11, No. 9, September 1986, pp. 581–583; R. C. Youngquist, et al., "All-fibre components using periodic coupling," *IEEE Proceedings*, Vol. 132, Pt. J, No. 5, October 1985, pp. 277–286; R. C. Youngquist, et al., "Two-mode fiber modal coupler," *Optics Letters*, Vol. 9, No. 5, May 1984, pp. 177–179; J. N. Blake, et al., "Fiber-optic modal coupler using periodic microbending," *Optics Letters*, Vol. 11, No. 3, March 1986, pp. 177–179; B. Y. Kim, et al., "All-fiber acousto-optic frequency shifter," *Optics Letters*, Vol. 11, No. 6, June 1986, pp. 389–391; and J. N. Blake, et al., "All-fiber acousto-optic frequency shifter using two-mode fiber," *Proceedings of the SPIE*, Vol. 719, 1986. The present invention provides substantial improvement to many of those devices and provides a number of new devices that utilize coupling between the modes to further control an optical signal.

Although the four $LP_{11}$ modes provide four orthogonal channels for the propagation of optical energy through an optical fiber or other waveguide, it has often been found to be difficult to fully utilize the four channels independently. As set forth above, the $LP_{11}$ modes are approximations of real modes and are nearly degenerate in a circular core fiber 100. This makes the $LP_{11}$ modes very sensitive to couplings caused by perturbations in the optical fiber, such as bending, twisting and lateral stressing. Furthermore, since the $LP_{11}$ modes are only an approximation of the rear modes, there will be a slight amount of coupling even in the absence of perturbations of the fiber 100. The net result is that the propagation of an $LP_{11}$ mode electric field pattern in a given mode is not stable. In like manner, the electric field patterns of the two $LP_{01}$ polarization modes are likewise unstable.

It has been previously shown that the use of an elliptical core cross-section in an optical fiber or other waveguide can introduce birefringence and separate the propagation constants for the two polarizations of the $LP_{01}$ first order mode. The separation of the propagation constants locks the polarization of the signal to a principle axis of the core cross-section. It has also been shown that an elliptical core also increases the separation between the propagation constants of the $LP_{11}$ mode patterns. This tends to enhance modal stability. This is illustrated in FIG. 4 which is an unscaled representation of the propagation constant $\beta$ versus the ellipticity of the core of an optical waveguide. As illustrated, the $LP_{01}$ propagation mode has a larger propagation constant than the $LP_{11}$ propagation mode. From Equation (2), this difference in the propagation constants is related to the beat length $L_B$ between the $LP_{01}$ and $LP_{11}$ propagation modes as follows:

$$\Delta\beta_{01} = \frac{2\pi}{L_{B01}} \quad (3)$$

where $\Delta\beta_{01}$ is the difference in the propagation constants between the $LP_{01}$ mode and the $LP_{11}$ mode and $L_{B01}$ is the beat length between the $LP_{01}$ and $LP_{11}$ modes.

As illustrated in the left-hand portion of FIG. 4, when the core of the optical waveguide is substantially circular, the $LP_{11}$ odd and even modes have substantially the same propagation constant. However, when the core of the optical waveguide is elliptical, the propagation constants of the odd and even $LP_{11}$ modes are different. This is illustrated by the propagation constant difference $\Delta\beta_{11}$ in the right half of FIG. 4. As illustrated, the difference in the propagation constants of the odd and even $LP_{11}$ modes ($\Delta\beta_{11}$) increases as the ellipticity increases. The use of an elliptical core optical fiber has been suggested as a means of avoiding the degeneracy of the orthogonal lobe orientations of the $LP_{11}$ modes. See, for example, J. N. Blake, et al., "All-fiber acousto-optic frequency shifter using two-mode fiber," *Proceedings of the SPIE*, Vol. 719, 1986.

The foregoing differences in the propagation constants between the $LP_{01}$ mode and the odd and even $LP_{11}$ modes when the core of the optical fiber is elliptical, also results in a change in the cutoff wavelength and the corresponding cutoff frequency. For example, for a circular core optical fiber, the cutoff wavelength is related to the radius of the fiber core, as set forth in Equation (1) above. Thus, optical signals having wavelengths above the second order mode cutoff wavelength $\lambda_c$ (i.e., frequencies below the second order mode cutoff frequency) will not propagate in the second order or higher modes in the optical fiber. Optical signals having wavelengths less than the cutoff wavelength $\lambda_c$ will propagate in the second order modes. If the wavelength is further reduced to a wavelength $\lambda_{c2}$, third order and higher modes will be supported by the optical waveguide. For a circular core optical waveguide, $\lambda_{c2}$ can be found by the following equation:

$$\lambda_{c2} = \frac{2\pi r \sqrt{n_{co}^2 - n_{cl}^2}}{3.832} \qquad (4)$$

where $r$, $n_{co}$ and $n_{cl}$ are as set forth above for Equation (1). One skilled in the art will understand that the foregoing can also be represented by cutoff frequencies. For example, the first cutoff wavelength $\lambda_c$ corresponds to a first cutoff frequency $f_c$, and the second cutoff wavelength $\lambda_{c2}$ corresponds to a second cutoff frequency $f_{c2}$ that is greater than the first cutoff frequency $f_c$. Specifically, for the circular core optical waveguide, if the first cutoff frequency $f_c$ is normalized to 2.405, the second cutoff frequency $f_{c2}$ will be normalized to 3.832. In other words, the second cutoff frequency will be 1.59 times greater than the first cutoff frequency (e.g., $f_{c2}/f_c = 3.832/2.405 = 1.59$). Thus, an optical signal having a normalized frequency less than 2.405 will propagate in the optical waveguide only in the $LP_{01}$ mode. An optical signal having a normalized frequency in the range of 2.405 to 3.832 will also propagate in the second order $LP_{11}$ mode. An optical signal having a normalized frequency greater than 3.832 will propagate in higher order modes.

The foregoing relationships also apply when the core of the optical waveguide is elliptical or has some other noncircular geometry. For example, Allan W. Snyder and Xue-Heng Zheng, in "Optical Fibers of Arbitrary Cross-Sections," *Journal of the Optical Society of America A*, Vol. 3, No. 5, May 1986, pp. 600-609, set forth the normalization factors for a number of different waveguide cross sections. For example, an elliptical core waveguide having a major axis that is twice the length of the minor axis, will have a normalized cutoff frequency $f_c$ of 1.889 when the minor axis has the same length as the diameter of a corresponding circular core optical fiber of the same material construction. In other words, below the normalized frequency of 1.889, only the first order $LP_{01}$ modes will propagate. Similarly, Snyder and Zheng suggest that the $LP_{11}$ even mode will have a normalized cutoff frequency of 2.505, and the $LP_{11}$ odd mode will have a normalized cutoff frequency of 3.426.

Snyder and Zheng generalize the foregoing concept for an elliptical core optical waveguide with varying ratios between the length of the minor axis and the length of the major axis as follows:

$$f_c = 1.700 (1+(b/a)^2)^{\frac{1}{2}} \qquad (5a)$$

$$f_{c2even} = 1.916 (1+3(b/a)^2)^{\frac{1}{2}} \qquad (5b)$$

$$f_{c2odd} = 1.916 (3+(b/a)^2)^{\frac{1}{2}} \qquad (5c)$$

where $f_c$ is the normalized cutoff frequency for the $LP_{01}$ mode, below which optical energy will propagate only in the $LP_{01}$ mode in the elliptical core optical fiber; where $f_{c2even}$ is the normalized cutoff frequency for optical energy propagating in the $LP_{11}$ even mode, below which optical energy will propagate only in the $LP_{11}$ even mode but not in the $LP_{11}$ odd mode; and where $f_{c2odd}$ is the normalized cutoff frequency for the $LP_{11}$ odd mode, below which optical energy will propagate in the $LP_{11}$ odd mode as well as the $LP_{11}$ even mode, but not in any of the higher order modes; b is one-half the length of the minor axis of the elliptical core; and a is one-half the length of the major axis of the elliptical core. Equations (5a), (5b) and (5c) can be evaluated for an elliptical core fiber having a major axis length 2a of twice the minor axis length 2b to obtain the normalized frequencies 1.889, 2.505 and 3.426, set forth above. Equations (5a), (5b) and (5c) can be further evaluated for b=a (i.e, for a circular core) to obtain the $LP_{01}$ cutoff frequency of 2.405 and the $LP_{11}$ cutoff frequency of 3.832 for both the odd and even modes, as set forth above.

The foregoing properties of the elliptical core optical waveguide are advantageously utilized in the present invention to improve the operating characteristics of the optical waveguide by eliminating the $LP_{11}$ odd propagation mode and thus provide only one spatial orientation for the electric field pattern of the second order mode. This is illustrated in FIGS. 5 and 6a-6g.

Figures 5, 6A, 6B, 6C:
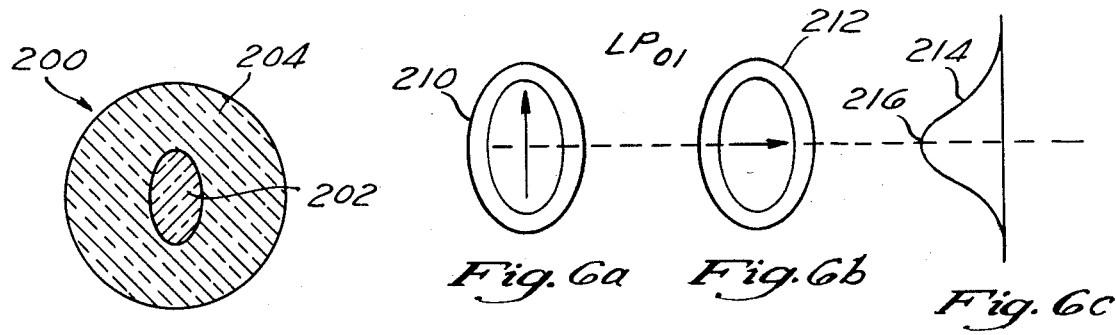
FIG. 5 is a cross-sectional view of an exemplary elliptical core.
FIGS. 6a and 6b illustrate the electric field intensity patterna for the $LP_{01}$ (fundamental) propagation modes of the elliptical core optical fiber of FIG. 5.
FIG. 6c is a graph of the electric field amplitude distribution for the $LP_{01}$ propagation mode of the elliptical core optical fiber of FIG. 5.

FIG. 5 illustrates an exemplary optical fiber 200 having an elliptical core 202 and a surrounding cladding 204. The dimensions of the elliptical core 202 are selected so that the cutoff wavelengths and frequencies for the two orthogonal lobe patterns of the second order mode are well separated. An optical signal is applied to the fiber 200 that is within a frequency range selected to be above the cutoff frequency $f_{c2even}$ and to be below the cutoff frequency $f_{c2odd}$. For example, in an exemplary optical fiber, having a first cutoff frequency $f_c$ that is normalized to 1.889, and a second frequency $f_{c2even}$ of 2.505, the frequency of the input optical signal is selected to have a normalized frequency in the range of 1.889 to 2.505. Thus, a light source is selected so that substantially all of the light produced by the light source has a normalized frequency that is substantially less than the second cutoff frequency $f_{c2even}$, and that has a substantial portion of the light that has a normalized frequency that is greater than the firs cutoff frequency $f_c$. In terms of wavelength, substantially all of the light produced by the light source has one or more wavelengths that are greater than the second cutoff wavelength $\lambda_{c2even}$, and wherein a substantial portion of the light has at least one wavelength that is less than the first cutoff wavelength $\lambda_c$. Thus, the light entering the optical fiber is caused to propagate only in either the first order $LP_{01}$ mode or the $LP_{11}$ even mode. Since the frequency of the optical signal is selected to be less than the cutoff wavelength for the $LP_{11}$ odd mode, substantially no light propagates in the $LP_{11}$ odd mode.

The foregoing is illustrated in FIGS. 6a-6g. In FIGS. 6a and 6b, the two polarization modes for the $LP_{01}$, first order mode are illustrated. An electric field pattern 210 in FIG. 6a represents the electric field for the vertically polarized $LP_{01}$ mode, and an electric field pattern 212 in FIG. 6b represents the electric field for the horizontally polarized $LP_{01}$ mode. One skilled in the art will understand that the optical fiber 200 (FIG. 5) is birefringent for the first order $LP_{01}$ mode, and that the horizontally polarized $LP_{01}$ mode will propagate at a greater velocity than the vertically polarized $LP_{01}$ mode. An electric field amplitude distribution 214 for the $LP_{01}$ propagation modes is illustrated in FIG. 6c. As illustrated, the electric field amplitude distribution 214 is similar to the electric field amplitude distribution 116 in FIG. 2b, for a circular core fiber and has a peak amplitude 216 proximate to he center line of the core 203.

Figures 6D, 6E, 6F:
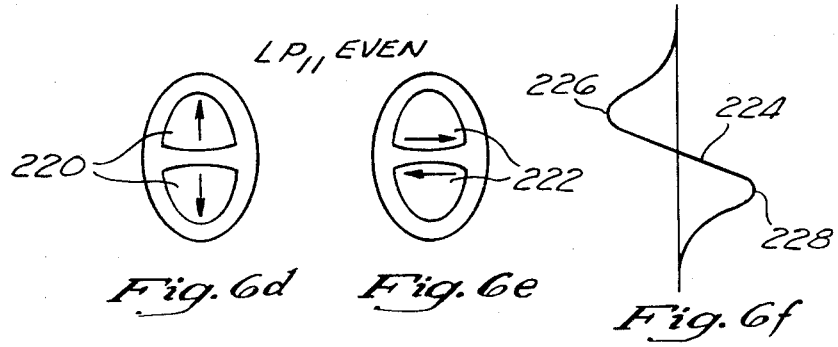
FIGS. 6d and 6e illustrate the electric field intensity patterns for the even $LP_{11}$ propagation modes of the elliptical core optical fiber of FIG. 5.
FIG. 6f is a graph of the electric field amplitude distribution for the even $LP_{11}$ propagation modes of the elliptical core optical fiber of FIG. 5.
Figures 6G, 6H:
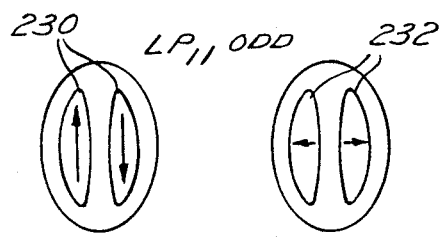
FIGS. 6g and 6h illustrate the electric field intensity patterns for the odd $LP_{11}$ propagation modes of the elliptical core optical fiber of FIG. 5.

FIGS. 6d and 6e illustrates the $LP_{11}$ even modes for the elliptical core fiber 200. As illustrated in FIG. 6d and FIG. 6e, respectively, a vertically polarized even mode electric field pattern 220 and a horizontally polarized even mode electric field pattern 222 are both well-guided by the optical fiber 200. As illustrated in FIG. 6f, the $LP_{11}$ even modes have an electric field amplitude distribution, represented by a curve 224, that has a first maxima 226 proximate to one boundary of the core, and that has a second maxima 228 proximate to an opposite boundary of the core, and wherein the first maxima 226 and the second maxima 228 are 180° out of phase.

The $LP_{11}$ odd vertical polarization mode, represented by an electric field pattern 230 (FIG. 6f), and the $LP_{11}$ odd horizontal polarization mode, represented by an electric field pattern 232 (FIG. 6g), are not guided by the optical fiber 200 when the optical wavelength is selected to be above the second cutoff wavelength $\lambda_{c2even}$. Thus, the optical energy in the $LP_{11}$ odd modes, represented by the field patterns 230 and 232, will not propagate. Thus, rather than providing four degenerate optical communication channels, such as provided by a circular core waveguide or a slightly elliptical core waveguide, the highly elliptical core 202 of the optical fiber 200 provides only two $LP_{01}$ mode propagation channels and two $LP_{11}$ even mode propagation channels. Furthermore, the communication channels are well-defined and stable and, in the absence of a perturbation in the optical fiber 200, there is no coupling between any of the four channels. Therefore, an optical signal can be launched in the second order $LP_{11}$ mode and it will propagate only in the $LP_{11}$ even mode. It is not necessary to avoid exciting the odd lobe patterns of the second order $LP_{11}$ mode because optical energy in those lobe patterns will not be coupled to the odd lobe patterns.

Because of the stability of the electric field intensity patterns of the $LP_{01}$ mode and the $LP_{11}$ even modes, the performances of fiber optic devices previously developed to utilize the second order $LP_{11}$ mode will be increased. Specific examples of devices utilizing the highly elliptical core waveguide will be set forth hereinafter.

DESCRIPTION OF THE DYNAMIC OPTICAL COUPLER

Figure 7:
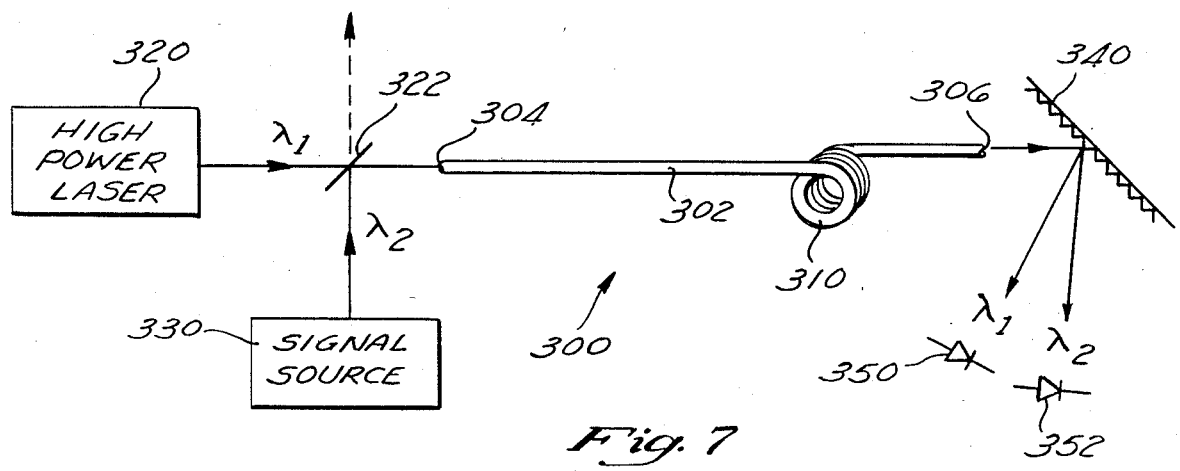
FIG. 7 illustrates a dynamic optical coupler constructed in accordance with the present invention in which light from a high power laser light source is propagating in an optical fiber in the same direction as light from an optical signal source.

The optical fiber 200 of FIG. 5, or another optical waveguide having a non-circular cross section, can be advantageously used in a dynamic optical coupler 300 illustrated in FIG. 7. The dynamic optical coupler 300 of FIG. 7 comprises an optical fiber 302. The optical fiber 302 has a first end portion 304 and a second end portion 306. An intermediate portion of the optical fiber 302 is formed into a tightly wound coil 310 to provide an $LP_{11}$ mode stripper, that will be explained more fully below. A high power laser light source 320 is provided that generates a laser output signal having a wavelength $\lambda_1$. The laser output signal can be switched on and off by selectively enabling and disabling the electricl input to the high power laser light source 320 with an electrical switch, or the like, by modulating the leaser output signal, or by other conventional means. The laser output signal generated by the source 320 is a perturbational signal, as will be explained below. The laser output signal from the high power laser light source 320 is directed to a beam splitter 322. Approximately 50% of the optical energy in the laser output signal passes through the beam splitter 322 and is input into the first end portion 304 of the optical fiber 302. The first end portion of the optical fiber 302 is positioned with respect to the beam splitter 322 so that the laser output signal from the high power laser light source 320 provides approximately equal excitation in the fundamental and second order modes of the optical fiber 302.

A signal source 330, which is advantageously a laser signal source is also provided. The signal source 330 generates a relatively low power output signal having a wavelength $\lambda_2$ that is preferably close to but not equal to the wavelength of $\lambda_1$. The lower power output signal from the signal source 330 is directed to the beam splitter 322 which directs approximately 50% of the optical energy of the lower power output signal to the first end portion of the optical fiber 302. The signal source 330 is positioned with respect to the first end portion 304 of the optical fiber 302 so that substantially all of the optical energy incident upon the first end portion 304 is caused to propagate in one or the other of the fundamental or the second order spatial mode.

A diffraction grating 340 is positioned proximate to the second end portion 306 of the optical fiber 302. The diffraction grating 340 is oriented with respect to the second end portion 306 of the fiber 302 so that optical signals output from the second end portion 306 having a wavelength $\lambda_1$ are refracted to a first location and optical signals output form the second end portion 306 having a wavelength $\lambda_2$ are refracted to a second location different from the first location. The refracted optical signals can be viewed with a screen (not shown), or, alternatively, the intensities of the refracted signals can be detected by first detector 350 positioned to detect the refracted optical signal having the wavelength $\lambda_1$ and a second detector 352 positioned to detect the refracted optical signal having the wavelength $\lambda_2$.

When the high power laser signal is applied to the first end portion 304 of the optical fiber 302, the approximately equal excitation of the first order $LP_{01}$ and the second $LP_{11}$ modes in the elliptical core of the two-mode fiber 302 creates a periodic pattern in the cross-sectional intensity distribution along the length of the optical fiber 302 as the two spatial modes propagate in the optical fiber 302 with different phase velocities. This is illustrated in FIG. 8 and in FIGS. 9a-9i, where FIG. 8 represents a portion of the optical fiber 302 and FIGS. 9a-9i represent cross-sections of the optical intensity distribution patterns at the locations 9a—9a, 9b—9b, etc., in FIG. 8. In FIGS. 9a-9i, the presence of optical energy in the intensity distribution is reprsented by the dark portions of the intensity patterns, and the absence of optical energy is illustrated by the light portions of the patterns. FIGS. 9a, 9c, 9e, 9g and 9i illustrate the highly asymmetric intensity distributions that occur at locations where the phase difference between the two modes in $N\pi$ and most of the optical power is concentrated in one half of the elliptical core. For example, FIG. 9a illustrates the intensity distribution when the phase difference is zero (i.e., $0\pi$); FIG. 9c illustrates the intensity distribution when the phase difference is $\pi$; and FIG. 9e illustrates the intensity distribution when the phase difference is $2\pi$. When the phase difference is $(N+\frac{1}{2})\pi$, the intensity distribution is symmetric. FIG. 9b illustrates the symmetric intensity distribution when the phase difference is $\pi/2$; and FIG. 9d illustrates the symmetric intensity distribution when the phase difference is $3\pi/2$. As illustrated in FIG. 8 and in FIGS. 9a-9i, the mode intensity patterns are periodic and repeat every beat length $L_B$ along the length of the optical fiber 302.

The existence of optical power in an optical waveguide, such as the optical fiber 302, alters the refraction index of the glass medium through the optical Kerr effect. This effect is due to the third order non-linear polarization of the glass medium and occurs even when the optical power is small. When the high power laser light from the high power laser light source 320 is launched into the optical fiber 302 with approximately equal intensity for the fundamental $LP_{01}$ and the second order $LP_{11}$ modes, this non-linear interaction of the light energy with the glass medium of the optical fiber 302 causes a periodic asymmetric perturbation of the refractive induces of the optical fiber 302. It has been shown that periodic perturbations in an optical fiber can cause coupling between two spatial propagation modes of an optical fiber when the periodicity of the perturbations are matched to the beat length of the two modes. Examples of mode coupling caused by periodic stresses are illustrated in B. Y. Kim, et al. "All-fiber acousto-optic frequency shifter," *Optics Letters*, Vol. 11, No. 6, June 1986, pp. 389-391; J. N. Blake, et al., "Fiber-optic modal coupler using periodic microbending,"*Optics Letters*, Vol. 11, No. 3, March 1986, pp. 177-179; and J. N. Blake, et al., "All-fiber acousto-optic frequency shifter using two-mode fiber," *Proceedings of the SPIE*, Vol. 719, 1986.

As set forth above, the wavelength $\lambda_2$ of the light generated by the signal source 330 is close to the wavelength of the light generated by the high power laser source 320. It has been shown that the beat length between the two spatial propagation modes of an optical signal does not vary significantly over a relatively wide range of wavelengths. Thus, the periodic changes in the refractive induces of optical fiber 302 caused by the high power laser light having the wavelength $\lambda_1$ are substantially well matched with the wavelength $\lambda_2$. As a result, the perturbations of the refractive indices cause coupling of optical energy between the fundamental and second order modes of the co-propagating optical energy from the signal source 330 (FIG. 7) in a manner similar to that provided by externally applied periodic perturbations.

The total amount of coupling from one propagation mode to the other propagation mode will vary in accordance with the power applied from the high power laser light source 320 and in accordance with the length of the optical fiber 302 in which the two optical signals interact. By varying the amount of power of the high power laser light source 320 and thus controlling the magnitude of the perturbations caused by the optical Kerr effect, the amount of coupling between the propagation modes of the optical signal generated by the signal source 320 can be controlled.

As an example of the operation of the present invention, the apparatus illustrated in FIG. 7 can be used as a dynamic optical switch in an optical signal processing system, an optical communications system, and the like. As set forth above, the optical energy generated by the signal source 330 is advantageously input into the first end portion 304 of the optical fiber 302 at a wavelength $\lambda_2$ with substantially of the optical energy in one or the other of the fundamental $LP_{01}$ mode or the second order $LP_{11}$ mode. For example, the optical energy from the signal source 330 can be advantageously input only in the $LP_{11}$ mode. When the high power laser light source 320 is off, the optical energy from the signal source 330 will propagate through the optical fiber 302 with substantially no coupling of optical energy from the $LP_{11}$ mode to the $LP_{01}$ mode. When the optical energy in the $LP_{11}$ mode reaches the mode stripper 310, the optical energy will be radiated from the optical fiber 302 and substantially no optical energy will be emitted from the second end portion 306 of the optical fiber 302. Thus, the $\lambda_2$ detector 352 will detect substantially no optical energy. Conversely, when the high power laser light source 320 is activated, the perturbations of the refractive induces of the optical fiber 302 will cause coupling of the optical energy from the optical fiber 302 will cause coupling of the optical energy from the $LP_{11}$ propagation mode of the $\lambda_2$ optical signal to the $LP_{01}$ propagation mode. The power of the high power laser light source 320 is advantageously adjusted so that substantially 100% coupling to the $LP_{01}$ mode occurs. Any residual optical energy in the $LP_{11}$ propagation mode will be radiated from the optical fiber 302 by the mode stripper 310. The optical energy in the $LP_{01}$ propagation mode at the wavelength $\lambda_2$ will be emitted from the second end portion 306 of the optical fiber 302 and will be directed to the $\lambda_2$ detector 352 by the diffraction grating 322. Thus, the signal output of the $\lambda_2$ detector 352 will be responsive to the on/off control provided by the activation/deactivation of the high power laser light source 320. In an optical signal processing system or optical communications system, the $\lambda_2$ signal output from the diffraction grating 340 can be advantageously provided as an input to additional optical components for further processing.

In like manner, the optical energy from the signal source 330 can be introduced into the first end portion 302 of the optical fiber 304 in the $LP_{01}$ propagation mode. When the high power laser light source 320 is off, the optical energy in the $LP_{01}$ propagation mode will propagate through the optical fiber 302 substantially unchanged and will be emitted from the second end portion 306 and detected by the $\lambda_2$ detector 352. Activation of the high power laser light source 320 will cause coupling of the optical energy from the $LP_{01}$ propagation mode to the $LP_{11}$ propagation mode of the $\lambda_2$ optical signal. The energy of the $LP_{11}$ propagation mode will be radiated from the optical fiber 302 at the mode stripper 310. Thus, if the high power laser light source 320 is adjusted to provide 100% coupling of the optical energy to the $LP_{11}$ propagation mode, substantially no $\lambda_2$ optical energy will be emitted from the second end portion 306 and detected by the $\lambda_2$ detector 352.

As set forth above, the optical energy from the high power laser light source 320 is preferably introduced into the first end portion 304 of the optical fiber 302 with approximately equal intensities in each of the fundamental $LP_{01}$ and second order $LP_{11}$ propagation modes. This is advantageously accomplished by adjusting the position of the high power laser light source 320 with respect to the first end portion 304 while observing intensity patterns of the optical output from the second end portion 306 of the optical fiber 302. The intensity patterns can be observed by directing the optical output onto a screen (not shown) or the like. There will be a position wherein the centerline of the beam of optical energy from the high power laser light source is offset from the centerline of the input end portion 304 of the optical fiber 302 such that the fundamental $LP_{01}$ made and the second order $LP_{11}$ of the optical energy propagating in the optical fiber 304 are substantially equally excited. As set forth above, the optical fiber 302 has a beat length at the optical wavelength $\lambda_1$. Because of the beat lengths, the intensity patterns of optical energy in the optical fiber 302 are periodic as illustrated in FIG. 8 and FIGS. 9a-9i. In the adjustment method described herein, the position of the high power laser light source 320 is preferably adjusted prior to the formation of the mode stripper 310 (i.e., before the fiber 302 is tightly wound to cause radiation of the optical energy propagating in the second order $LP_{11}$ propagation mode). Thus, optical energy in both the fundamental $LP_{01}$ and the second order $LP_{11}$ propagation mode will be emitted from the second end portion 306 of the optical fiber 302. While holding the first end portion 304 in a fixed location, the optical fiber 302 is gently stretched to adjust the length of the optical fiber 302 between the first end portion 304 and the second end portion 306 until the observed intensity pattern exhibits one of the intensity patterns corresponding to a phase different between the fundamental $LP_{01}$ and the second order $LP_{11}$ propagation modes that is an integer multiple of $\pi$ (i.e., one of the mode patterns illustrated in FIGS. 9a, 9c, 9e, etc.). After one of the desired intensity patterns is obtained, the first end portion 304 and the second end portion 306 are held in their respective positions to maintain the intensity mode pattern. While holding the first end portion 304 and the second end portion 306 fixed, the position of the high power laser light source 320 is adjusted with respect to the first end portion 304 until the maximum contrast is obtained between the lighted portions of the intensity pattern and the unlighted portion of the intensity pattern. The adjustment of the position of the high power laser light source 320 to obtain maximum contrast corresponds generally to the adjustment of the high power laser light source 320 to obtain substantially equal intensity in the fundamental $LP_{01}$ and the second order $LP_{11}$ propagation modes although the two intensities may not be precisely equal.

In a similar manner, the position of the signal source 330 with respect to the first end portion 304 of the optical fiber 302 is adjusted until substantially all of the $\lambda_2$ optical energy is introduced into the first end portion 304 in one or the other of the propagation modes. This adjustment is also performed prior to forming the mode stripper 310 and while holding the first end portion 304 fixed with respect to the high power laser light source 320 after the previous adjustment. However, rather than attempting to obtain maximum contrast between the light and dark portions of the intensity patterns, the position of the signal source 30 is adjusted to provide minimum variation in the intensity pattern as the optical fiber 302 is stretched. In other words, if the optical energy introduced into the first end portion 304 from the signal source 330 is in one propagation mode only, there will be no beating between the two modes and the intensity pattern will not vary as the length of the optical fiber 302 is increased or decreased. Thus, the optical fiber 302 is stretched and released repeatedly as the position of the signal source 330 is gradually adjusted with respect to the centerline of the first end portion 304 of the optical fiber 302. When the optical fiber can be stretched and released with no perceptible change in the observed intensity pattern, substantially all of the $\lambda_2$ optical energy is propagating in one or the other of the two propagation modes. The mode in which the optical energy is propagating can be readily determined by observing the intensity pattern. As illustrated in FIGS. 6a and 6b, the fundamental $LP_{01}$ propagation mode has an intensity pattern that is concentrated in and substantially symmetrical about the center of the optical fiber 302, while the second order $LP_{11}$ propagation mode has an intensity pattern with two lobes displaced equally from the center of the optical fiber 302, as illustraed in FIGS. 6d and 6e. One can see that the use of an optical fiber or other waveguide have a geometry such as the highly elliptical core is advantageous in enabling the positions of the two optical signal sources to be readily adjusted with respect to the centerline of the core.

After the position of the high power laser light source 320 and the position of the signal source 330 are adjusted with respect to the first end portion 304 of the optical fiber 302, a portion of the optical fiber 302 is formed into the mode stripper 310 and the second end portion 306 is directed at the diffraction grating 322. The apparatus is then operable as described above.

Figure 10:
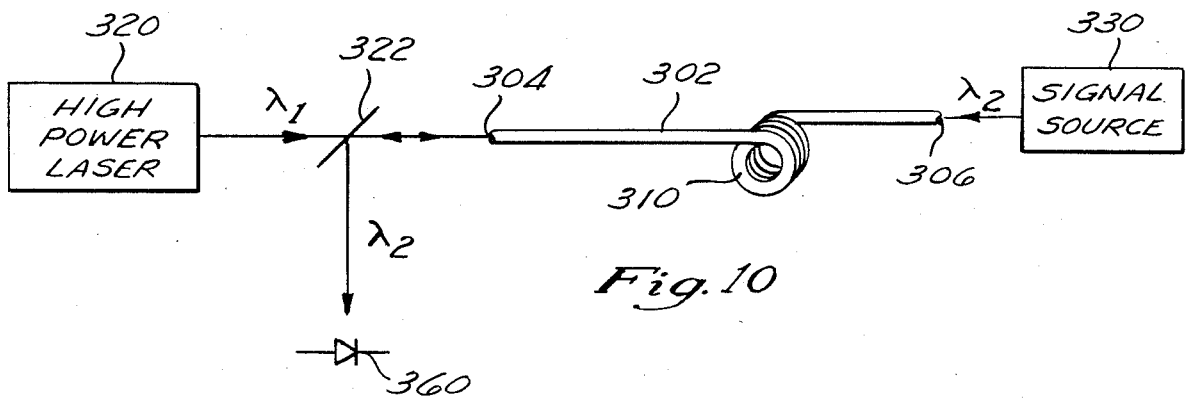
FIG. 10 is an alternative embodiment of the present invention in which the light from a high power laser light source is propagating in an optical fiber in the opposite direction as light from an optical signal source.

A second embodiment of the present invention is illustrated in FIG. 10 wherein like numbers designate the same elements as were described above in connection with FIG. 7. The elements of FIG. 10 are positioned as in FIG. 7 except there is no diffraction grating in FIG. 10 and the signal source 330 is positioned proximate to the second end portion 306 of the optical fiber 302. The perturbational signal from the high power laser light source 320 propagates in a first direction in the optical fiber 302 from the first end portion 304 to the second end portion 306, as before. However, the optical signal from the signal source 330 is introduced into the second end portion 306 and propagates in a second opposite direction from the second end portion 306 to the first end portion 304. The optical energy from the signal source 330 is emitted from the first end portion 304 and is directed by the beam splitter 322 towards a $\lambda_2$ detector 360. In the apparatus in FIG. 10, the position of the high power laser light source 320 with respect to the first end portion 304 of the optical fiber 302 is adjusted as before prior to forming the mode stripper 310. The position of the signal source 330 is adjusted so that a large portion of the optical energy introduced into the second end portion 306 is introduced in the fundamental $LP_{01}$ propagation mode. However, it is not necessary to accurately adjust the position of the signal source 330 with respect to the second end portion 306 so that the optical energy introduced into the second end portion is only in the $LP_{01}$ propagation mode. Rather, substantially all of the optical energy introduced into the second end portion 306 in the second order $LP_{11}$ propagation mode is radiated from the optical fiber 302 in the mode stripper 310 so that substantially all of the optical energy propagating towards the first end portion 304 is initially in the fundamental $LP_{01}$ propagation mode. Thus, the position of the signal source 330 with respect to the second end portion 306 can be adjusted after the mode stripper 310 is formed in the optical fiber 302. The proper positioning of the signal source 330 can be obtained by monitoring the output signal emitted from the first end portion 304 and directed onto the $\lambda_2$ detector 360 while adjusting the position of the signal source 330 for maximum detected intensity.

Figures 11A, 11B:
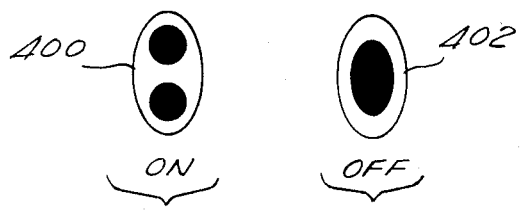

The apparatus of FIG. 10 operates in a similar manner to the apparatus of FIG. 7. When the higher power laser light source 320 is not activated, the optical energy from the signal source 330 propagates through the optical fiber 302 substantially unchanged and is emitted from the first end portion 304 in the fundamental $LP_{01}$ propagation mode. The emitted optical energy is represented by an intensity pattern 402 in FIG. 11b. In contrast, when the high power laser light source 320 is activated, the perturbations in the optical fiber 302 caused by the optical Kerr effect cause coupling of optical energy from the fundamental $LP_{01}$ mode to the second order $LP_{11}$ mode. The optical energy in the $LP_{11}$ mode is emitted from the first end portion of the optical fiber 302 and produces an intensity pattern 400 as illustrated in FIG. 11a. Thus, by selectively activating and deactivating the high power laser light source 320, the light introduced into the second end portion 306 from the signal source 330 can be selectively emitted from the first end portion 304 of the optical fiber 302 in either the fundamental $LP_{01}$ propagation mode or the second order $LP_{11}$ propagation mode. The output from the first end portion 304 can be advantageously provided as an input to additional optical components for further processing.

Since the optical energy from the high power laser light source 320 and the signal source 330 are counter-propagating, it is not necessary that the wavelength $\lambda_2$ of the signl source 330 be different from the wavelength $\lambda_1$ of the high power laser light source 320. Thus, $\lambda_1$ can be equal to $\lambda_2$, and the beat length of the controlling light signal is precisely matched to the beat length of the controlled light signal.

Although described above with reference to the preferred embodiments, modifications within the scope of the invention may be apparent to those skilled in the art, and all such modifications are intended to be within the scope of the appended claims.

What is claimed is:

1. An optical mode coupling apparatus comprising an optical waveguide which couples an optical signal propagating in the optical waveguide between propagation modes of the waveguide, the optical signal having an optical signal beat length for the modes, the coupling apparatus further comprising a light source for introducing a perturbational light signal into the waveguide, the perturbational signal having an optical wavelength selected such that the perturbational signal propagates in the waveguide in two spatial modes which have different propagation constants so as to cause the perturbational signal to beat in the waveguide in accordance with a perturbational signal beat length and thereby cause the perturbational signal to have an intensity distribution in the waveguide which varies along the length of the waveguide, the perturbational signal having an intensity which is selected to optically perturb the refractive index of the waveguide at intervals defined by the perturbational signal beat length, the optical wavelength of the perturbational signal further selected such that the intervals have a spacing related to the beat length of the optical signal to cause cumulative coupling of said optical signal from one of the propagation modes to another.

2. The device defined by claim 1, wherein the optical waveguide has a noncircular cross section having cross-sectional dimensions selected such that the waveguide guides a portion of the perturbational signal in a fundamental spatial mode and another portion in a higher order spatial mode, the cross-sectional dimensions of the perturbational signal guided by the waveguide in the higher order mode propagates in only a single, stable intensity pattern.

3. The apparatus defined by claim 2, wherein the fundamental spatial mode includes two polarization modes, the cross-sectional dimensions of the core further selected to cause the polarization modes of the fundamental mode to be non-degenerative.

4. The apparatus defined by claim 3, wherein the single intensity pattern of the higher order spatial mode includes two polarization modes, the cross-sectional dimensions of the core further selected to cause these polarization modes to be non-degenerate.

5. The apparatus defined by claim 2, wherein the waveguide comprises an optical fiber, the fundamental mode being the $LP_{01}$ mode of the optical fiber and the higher order mode being the $LP_{11}$ mode of the optical fiber, the single intensity pattern being the even mode intensity pattern of the $LP_{11}$ mode.

6. The apparatus defined by claim 5, wherein the core of the optical fiber has an elliptical cross section.

7. The device defined by claim 1, wherein the refractive index perturbations of said waveguide are produced by the optical Kerr effect.

8. The device defined by claim 1, wherein said propagation modes are the first and second order modes of the waveguide.

9. The device defined by claim 8, wherein the two spatial modes are the first and second order modes of the waveguide.

10. The apparatus defined by claim 1, wherein said perturbational signal varies in intensity to cause said coupling to vary.

11. The apparatus defined by claim 1, wherein said light source includes a switch for digitally varying said perturbational signal.

12. A method of coupling an optical signal between propagation modes of a waveguide, said waveguide having a beat length for said modes, said method comprising:
   introducing a perturbational optical signal into said waveguide such that said perturbational signal propagates in two spatial modes of the waveguide to cause the perturbational signal to beat in accordance with a perturbational signal beat length;
   selecting the intensity of the perturbational signal to cause optical perturbation of the waveguide at intervals defined by the perturbational signal beat length; and
   selecting the wavelength of the perturbational signal such that the intervals have a spacing related to the beat length of the optical signal to cause said coupling to be cumulative at said intervals.

13. The method of claim 12, wherein the intensity of said perturbational signal induces the perturbations in accordance with the optical Kerr effect.

14. The method of claim 13, wherein the waveguide comprises an optical fiber.

15. The method of claim 12, additionally comprising the step of switching the perturbational signal between a relatively high intensity level and a relatively low intensity level.

16. The method of claim 12, wherein the waveguide has a core of noncircular cross section, said method additionally comprising the step of selecting the wavelength of the optical signal in relation to the cross-sectional dimensions of the core such that (1) the waveguide guides a portion of the optical signal in one spatial mode and another portion in a higher order spatial mode, and (2) the portion of the optical signal guided by the waveguide in the higher order mode propagates in only a single, stable intensity pattern.

17. The method of claim 16 additionally comprising the step of selecting the wavelength of the perturbational signal in relation to the cross-sectional dimensions of the core of the waveguide such that (1) the waveguide guides a portion of the perturbational signal in one spatial mode and another portion in a higher order spatial mode, and (2) the portion of the perturbational signal guided by the waveguide in the higher order mode propagates in only a single, stable intensity pattern.

* * * * *

UNITED STATES PATENT AND TRADEMARK OFFICE
CERTIFICATE OF CORRECTION

PATENT NO. : 4,741,586

DATED : May 3, 1988

INVENTOR(S) : Byoung Y. Kim and Hebert J. Shaw

It is certified that error appears in the above-identified patent and that said Letters Patent is hereby corrected as shown below:

Column 5, line 46, change "odd move" to --odd mode--.

Column 10, line 44, change "firs cutoff" to --first cutoff--.

Column 11, line 40, after "will not" insert --propagate. Furthermore, optical energy will not--.

Column 11, line 66, change "leaser" to --laser--.

Column 13, line 19, change "induces" to --indices--.

Column 13, line 40, change "induces" to --indices--.

Column 13, line 67, after "substantially" insert --all--.

Column 14, line 15, change "induces" to --indices--.

Column 15, line 2, change "made" to --mode--.

Column 15, line 54, change "signal source 30" to --signal source 330--.

Column 16, line 11, change "have" to --having--.

UNITED STATES PATENT AND TRADEMARK OFFICE
CERTIFICATE OF CORRECTION

PATENT NO. : 4,741,586
DATED : May 3, 1988
INVENTOR(S) : Byoung Y. Kim and Hebert J. Shaw It is certified that error appears in the above-identified patent and that said Letters Patent is hereby corrected as shown below:

Column 17, line 66, before "the perturbational" insert
-- the core further selected such that the portion of --.

Signed and Sealed this

Sixth Day of December, 1988

Attest:

DONALD J. QUIGG

*Attesting Officer*     *Commissioner of Patents and Trademarks*